US008407153B2

(12) United States Patent
Mather

(10) Patent No.: US 8,407,153 B2
(45) Date of Patent: Mar. 26, 2013

(54) INTELLIGENT INTERACTIVE MAIL OPENING TRACKING METHOD AND SYSTEM

(75) Inventor: Raymond G. Mather, Southbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 1129 days.

(21) Appl. No.: 11/959,955

(22) Filed: Dec. 19, 2007

(65) Prior Publication Data
US 2009/0164662 A1  Jun. 25, 2009

(51) Int. Cl.
*G06Q 30/00* (2012.01)
(52) U.S. Cl. .......................................... 705/333
(58) Field of Classification Search .............. 705/1, 333
See application file for complete search history.

(56) References Cited

U.S. PATENT DOCUMENTS

| | | | |
|---|---|---|---|
| 4,205,780 A | 6/1980 | Burns et al. | |
| 5,031,223 A | 7/1991 | Rosenbaum et al. | |
| 5,444,794 A | 8/1995 | Uhland, Sr. | |
| 5,794,789 A | 8/1998 | Payson et al. | |
| 5,909,509 A * | 6/1999 | Chiang et al. | 382/228 |
| 6,141,654 A | 10/2000 | Heiden et al. | |
| 6,154,733 A | 11/2000 | Pierce et al. | |
| 6,156,988 A | 12/2000 | Baker | |
| 6,173,274 B1 | 1/2001 | Ryan, Jr. | |
| 6,178,411 B1 | 1/2001 | Reiter | |
| 6,196,393 B1 | 3/2001 | Kruk, Jr. et al. | |
| 6,285,777 B2 | 9/2001 | Kanevsky et al. | |
| 6,311,846 B1 | 11/2001 | Hayduchok et al. | |
| 6,327,580 B1 | 12/2001 | Pierce et al. | |
| 6,356,883 B1 | 3/2002 | Katikaneni et al. | |
| 6,408,286 B1 | 6/2002 | Heiden | |
| 6,487,302 B2 | 11/2002 | Foley | |
| 6,536,189 B1 * | 3/2003 | Murray | 53/440 |
| 6,721,783 B1 | 4/2004 | Blossman et al. | |
| 6,816,838 B1 | 11/2004 | Ryan, Jr. | |
| 6,865,558 B1 | 3/2005 | Pierce et al. | |
| 6,970,856 B1 | 11/2005 | Heiden et al. | |
| 7,062,474 B1 | 6/2006 | Reiter | |
| 7,161,108 B2 | 1/2007 | O'Connell et al. | |
| 7,424,436 B2 | 9/2008 | Katikaneni et al. | |
| 2001/0042022 A1 * | 11/2001 | Kirkpatrick et al. | 705/26 |
| 2003/0072469 A1 | 4/2003 | Alden | |
| 2004/0139033 A1 | 7/2004 | Amato | |
| 2005/0123170 A1 | 6/2005 | Desprez et al. | |
| 2005/0127157 A1 | 6/2005 | Stemmle et al. | |

OTHER PUBLICATIONS

United States Postal Service-Intelligent Mail Barcode (4-State Customer Barcode) USPS Specification—Jul. 8, 2005.

* cited by examiner

*Primary Examiner* — John Hayes
*Assistant Examiner* — Allen J Jung
(74) *Attorney, Agent, or Firm* — George M. Macdonald; Charles R. Malandra, Jr.; Steven J. Shapiro

(57) ABSTRACT

A method for tracking the opening of physical mail includes preparing a mail piece for delivery to a mailpiece recipient, the mailpiece having identifying information thereon, and communicating the mailpiece identifying information to a mail opening tracking organization. The mailpiece is delivered to the mailpiece recipient. The mailpiece is mechanically opened and data related to the mailpiece opening event is captured and the data related to the mailpiece opening event is communicated to the tracking organization.

8 Claims, 4 Drawing Sheets

INTELLIGENT INTERACTIVE MAIL OPENING TRACKING METHOD AND SYSTEM

FIELD OF THE INVENTION

The invention disclosed herein relates generally to physical mail and, more particularly, to an intelligent interactive mail opening tracking method and system that employs physical mail, electronic information concerning the physical mailpiece, establishes a flow of communications between a sender, recipient and, if desired, third parties to help enhance the value of the mail.

BACKGROUND OF THE INVENTION

Various systems have been developed for sorting, scanning and routing imaged documents. One such system is disclosed in U.S. Pat. No. 7,161,108 B2 for SYSTEM AND METHOD FOR ROUTING IMAGED DOCUMENTS issued Jan. 9, 2007 and assigned to Pitney Bowes Inc. In one configuration disclosed in the '108 patent, incoming mixed mail is sorted and coded, then extracted and scanned using the code to separate items. The separate imaged documents are then routed using the code. In another configuration disclosed in the '108 patent, the documents are automatically extracted from the envelopes. In yet another configuration disclosed in the '108 patent, the intended recipient is sent an identifier used to reference the code and retrieve the imaged document.

Another system is disclosed in U.S. patent application Ser. No. 11/588,058 filed Oct. 26, 2006 for INTELLIGENT PHYSICAL MAIL METHOD AND SYSTEM, assigned to Pitney Bowes Inc. This system includes looking up a mailpiece preference of an addressee concerning mail received by the addressee. A physical mailpiece to the addressee is prepared and includes on the mailpiece the addressee preference. The mailpiece is scanned to determine the addressee preference. The mailpiece may also be processed to link to the mailpiece the owner of a meter employed to imprint an indicia on the mailpiece. This system may also include a database of recipient preferences and a sender mail creation means coupled to the recipient preference database. A processor is coupled to a scanner and a communications means is coupled between the processor and the sender mail creation means for communicating recipient preferences to the sender mail creation means for storage in the database of recipient preferences.

The above systems are an improvement in the handling of physical mail. Additionally, a variety of techniques have been implemented to encourage mail recipients to open received mailpieces by improving the appearance of mail and assuring actual delivery of the mailpiece. These types of techniques have included metering the mail and using delivery confirmation services provided by the postal services or by commercial carriers. It is desirable for mailers to know that mail addressed to recipients is indeed received and opened in a timely manner. Moreover, it is desirable to enhance the value of physical mail to the mailer and the mail recipient.

SUMMARY OF THE INVENTION

It is an object of the present invention to help enhance the value of the mail to mailers and mail recipients.

It is another object of the present invention to obtain information if an envelope is actually opened and, if so, when the event takes place.

It is a further object of the present invention to establish a flow of communications between mailers, mail recipients and, if desired, third parties whereby interactive communications are established specific to mail recipient mail opening activity.

It is yet a further object of the present invention to encourage mail recipients to open received mailpieces and to automate the communication to a mail tracking organization of the opening event of received mailpieces.

It is still a further object of the present invention to encourage mail recipients to open received mailpieces.

A method for tracking the opening of physical mail embodying the present invention includes preparing a mail piece for delivery to a mailpiece recipient, the mailpiece having identifying information thereon, and communicating the mailpiece identifying information to a mail opening tracking organization. The mailpiece is delivered to the mailpiece recipient. The mailpiece is mechanically opened and data related to the mailpiece opening event is captured and the data related to the mailpiece opening event is communicated to the tracking organization.

A mail opening tracking system embodying the present invention includes a mailing organization and a mail tracking organization with a communications channel connected between the mailing organization and the mail tracking organization for communicating mailpiece identifying information embedded in mailpieces prepared for mailing to recipients. A communications channel is connected between a mailpiece recipient mail opener and the mail tracking organization for communicating mailpiece opening events of received mailpieces opened by the mail recipient mail opener and identifying data retrieved from received mailpieces opened by the recipient mail opener.

DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention. As shown throughout the drawings, like reference numerals designate like or corresponding parts.

DETAILED DESCRIPTION OF THE PRESENT INVENTION

Figure 1:
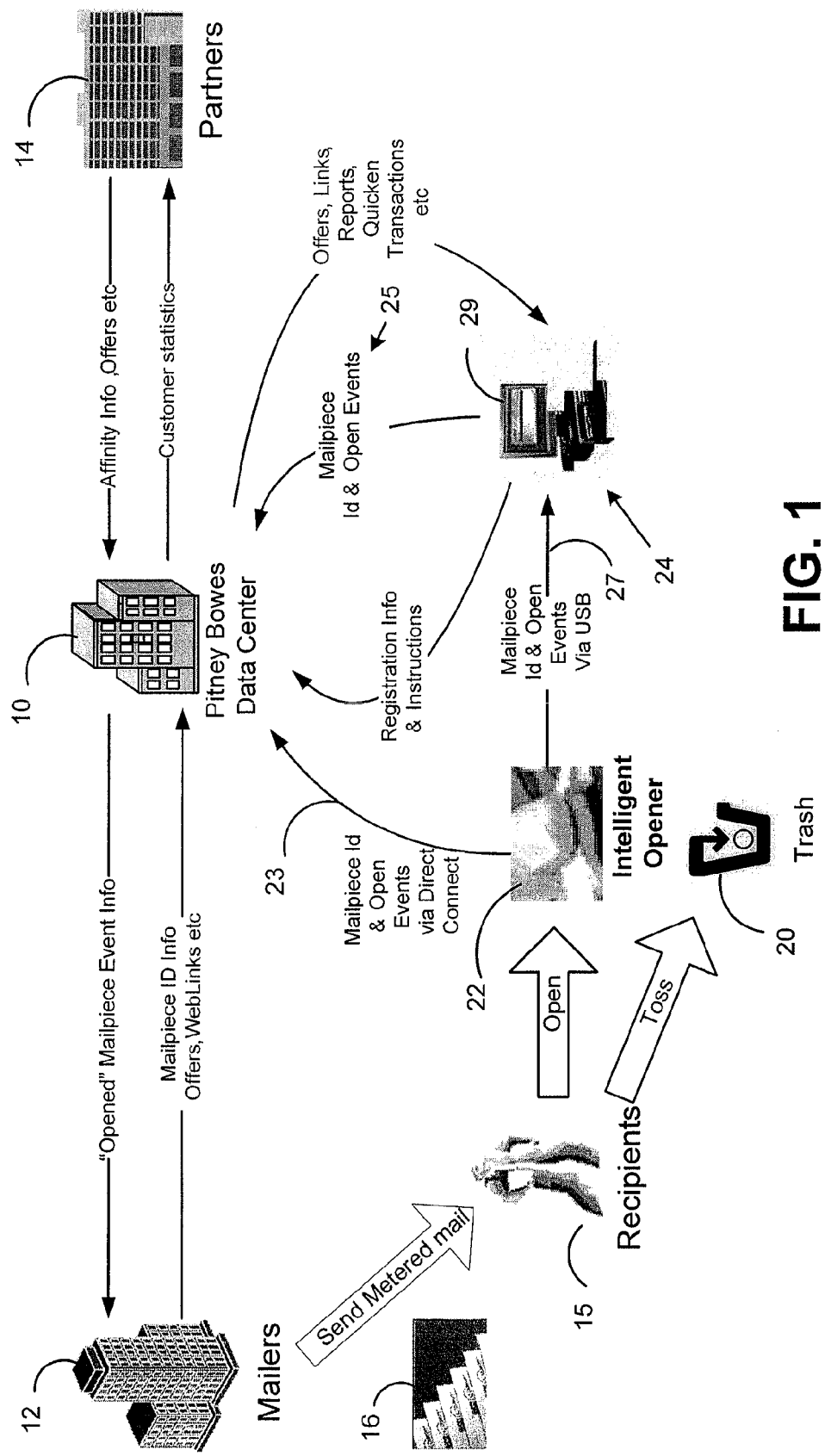
FIG. 1 is a schematic diagram of an intelligent interactive mail opening tracking system embodying the present invention.

As will be described below in connection with FIGS. 1-4, mailers interested in knowing when and by whom a mailpiece is opened collaborate with a tracking organization, a provider of an intelligent mail opening tracking services. Mail recipients are equipped with intelligent mail opener equipment and communication devices. The mail recipients register with the tracking organization for operation within the tracking system. Mail recipients register as users of the system in order to be awarded affinity program benefits (similar to frequent flier miles) to be accumulated based on the volume and, if desired, the attributes (mailer identity, advertising sponsor of the mail etc.) of the envelopes that they open.

Mailing organizations utilize a data processing system to generate mailbatch or unique mailpiece identification data, such as an identification that identifies particular mailing content. The mailbatch or mailpiece identification is associated with attributes and descriptors that are important to the mailer when analyzing mailpiece opening tracking information. This mailbatch or unique mailpiece identification is entered into an appropriately equipped postage meter system as the mailpieces for the mailbatch or unique mailpieces are processed by the postage meter system. The mailbatch or unique mailpiece identification is linked to an information-based indicia (IBI) that is printed on each envelope or mailing tape produced by the postage meter system. Each printed IBI is unique to the specific mailpiece. The mailbatch or unique mailpiece identification is stored in the postage meter with the linked unique tracking information of the IBI and provided to the mailer data processing system. A file of mail batch or unique mailpiece identification numbers, the linked IBI unique tracking information and/or other identification data is forwarded by the mailer to a tracking organization that operates a server for communication with the intelligent mail openers and/or with the mail recipients' personal computers. The forwarded file may also contain targeted information, such as web site Universal Resource Locators (URLs), offer numbers, etc., to be displayed to the individuals (mail recipients) opening the mail. After processing by the postage meter system, as described above, the mailpieces are tendered to a postal authority or delivery service for delivery to addressees.

The intelligent mail opener is a commercially available device that assists in opening envelopes, that is outfitted with an optical scanning device to read the IBI or other identification data from envelopes as they are being opened, and a communication module to transmit information read from the scanner to an output port. Multiple methods of operation and communication can be employed. A Universal Serial Bus (USB) communication to a personal computer can be used, where the scanned information will be processed by a computing program in the mail recipient PC that thereafter passes the information, date and time stamps, and recipient registration information stored in data files on the computer, to the tracking organization data processing server described above. Another form of communications that can be used is networked communication through an internet connection directly to the tracking organization data processing server. In this communication method, an Internet Protocol (IP) address and/or serial number of the intelligent mail opener can be linked to the registration information of the owner of the device. Offline storage of the scanned information within a memory module associated with the intelligent opener can also be used where the data is communicated to the tracking organization processing server in a batch at a convenient time. As the mail is opened by the intelligent mail opener, the scanned information is communicated to the tracking organization data processing server. Upon receiving the opening event and IBI data from the intelligent mail opener, the tracking organization data processing server uses the unique identifier associated with the IBI and/or other identifying information to link the event to previously recorded mailbatch or unique mailpiece attribute information.

Depending on the method of communication selected above, and/or registration preferences of the mail recipient, the tracking organization data processing server may also display web pages on the mail recipients personal computer or similar devices, such as a suitably equipped wireless cell phone, that direct the mail recipient to specific offers provided by the mailer or sponsors of the mailings. In addition, the tracking organization data processing server records updates to the mail recipient reward program account, based on the fact that the mail was opened. Other related reward program functions are also provided by the data processing server, or affiliated external systems. On a predetermined basis, the data processing server also provides the mailing organization with data describing who opened the mail, when the mail was opened, and, optionally, additional tracking and demographic information about the registrant. The activities of the mailing organization or tracking organization relating to the mail recipient rewards program can be implemented by partner organizations that administer various reward programs.

The system thus provides a mechanism to assist in opening mail and, during the process of opening, scans and acquires information contained in an intelligent meter indicia and/or other identifying information that, when combined with registration information, a date and time stamps of the envelope opening event and transmission to a mail tracking organization, creates an information source that can be provided to the mailers and others indicating when and who has opened a mailpiece. The system because of the communications channels and organization can include multiple inducements for various mailing organizations, tracking organizations, partner organizations and mail recipients to participate in the system, by providing benefits beyond the simple act of opening the mailpiece.

Reference is made to FIG. 1. A tracking organization 10, such as a Pitney Bowes data center, is interactively connected to a mailing (mailer) organization 12, partner organization 14, and mail recipients 15 equipment. The interaction includes communications from the mailing organization 12 to the tracking organization 10 of mailpiece identification information, offers, web links, and other related information. The communications from the tracking organization 10 to the mailing organization 12 include information concerning opened mailpiece event information. The communications from the tracking organization 10 to the partner organizations 14 include information such as mail recipient activity, statistics, and other data. The communications from the partner organizations 14 to the tracking organization 10 include information such as affinity program information, offers, and other data. The same or similar information may be exchanged between the various elements in the intelligent interactive mail opening system. For example, specific mail recipient programs originating at the partner organization 14 may be communicated to the tracking organization 10, to the mailing organization 12, and also to the mail recipients 15 over the communications interconnections. Similarly, information concerning the mail recipients' activity originating with the mail recipients 15 may be communicated to the tracking organization 10, and from the tracking organization 10 to the mailing organization 12 and to the partner organization 14.

The tracking organization 10 may be connected to many different mailing organizations 10 and many different partner organizations 14. The mailing organizations may have affinity or other programs for mail recipients and may have associations with none or several partner organizations. Moreover, the mailing organizations 12 may be the actual mailer of the mailpiece to the mail recipient or can be a mail provider service, such as Pitney Bowes Management Services, which implements mailing and mail related activities for various organizations. Additionally, the mailing organization can implement all or some of the activities of the partner organization. In such case, the role of the partner organization 14 in the system may be diminished or eliminated.

One or more affinity programs and related information may be provided to mail recipients for participating in the intelligent interactive mail tracking system. The affinity programs are programs that originate with the mailing organization 12 and/or partner organization 14, and/or mail tracking organization 10, to provide mailer recipients 15 with incentives for participating in the system and opening received mail and allowing tracking of the mail opening activity. Greater or different incentives can be provided to those mail recipients who demonstrate that they have looked at the received mailpiece contents. The affinity programs provided to recipients may be similar to frequent flier miles offered by airlines for passenger travel on the various airlines, which are administered by the airlines or by provider organizations on behalf of the airlines. Affinity points, redeemable for various benefits, can be provided to mail recipients 15, based on the number and/or type of mailpieces opened as communicated to the tracking organization 10.

The mailing organization 12 sends mailpieces to recipients 15. The mailpieces may be metered mail, for example, mailpieces imprinted with a United States Postal Service (USPS) Information-Based Indicia (IBI). Mail with such indicia as proof of postage payment may have imbedded in the IBI imprinted barcode identification of the specific mailpiece, identification of the mailer and identification of the mail recipient and, where desired, linked mailbatch identification. Indicias of this type are described in United States Postal Service publications concerning IBI, including the publication United States Postal Service Information Based Indicia Program (IBIP)—IBI Data Dictionary and Indicia Formats, Document Version 6.3B dated Mar. 28, 2007. Alternatively, this type information may be included in tracking information provided on the mailpiece, which identifies the specific mailpiece, the mailer, and the mail recipient. An example of this type tracking information is the USPS Intelligent Mail Barcode (IMB), also known as the USPS 4-State Customer Barcode. The USPS IMB is described in United States Postal Service Publication USPS-B-3200 revision E dated Oct. 30, 2007, which is available at ribbs.usps.gov/OneCodeSOLUTION. Other schemes may be employed for identifying the specific mailpiece, the mailer, and the mail recipient.

The mail recipient 15 may choose to dispose of the mail 16 and place it in a trash 20 or open the mail as, for example, with an intelligent mail opener 22. One mail opener that could be modified to become an intelligent mail opener is the Pitney Bowes model 1220 Mail Opener. The intelligent mail opener 22 may be connected to the tracking organization 10 to provide mailpiece identification and opening events through a direct connection 23 and/or from the mail recipient personal computer (PC) 24 through an interactive bi-directional connection 25. The intelligent opener 22 is connected to the mail recipient PC 24 by a USB 27. Mailpiece identification and opening events and other information imbedded on the mailpiece which is read by the intelligent opener 22 are communicated by the intelligent opener 22, along with other information such as envelope opening date and time, over the connection 27 to the mail recipient PC 24 and from the mail recipient PC 24 over the interactive bi-directional connection 25 to the tracking organization 10. Since the connection between the mail recipient PC 24 and the tracking organization 10 is bi-directional, the mailpiece identification and opening events may be communicated from the recipient PC 24 to the tracking organization 10 and the tracking organization may communicate to the recipient PC 24 various offers, links, reports, financial-type transactions and the like, and can have various pop-up items appear on the mail recipient PC screen 29, based on the communicated mail opening activity and follow-up activity of the mail recipient 15. This provides a unique ability for the tracking organization 10 to implement an immediate targeted response to the mail recipient that is both timely and specific to the mail recipient 15 mail opening activity.

Different arrangements of the equipment can be implemented. For example, the intelligent mail opener 22 may have an interactive, bi-directional communication with the tracking organization 10 and provide the bi-directional communication channel between the tracking organization 10 and the mail recipient 15. The information transmitted over the channel may be stored on the intelligent opener 22 for later access, for example, by the mail recipient PC 24. Additionally, the intelligent opener 22 and/or the mail recipient PC 24 may include a scanner to scan information on the mailpiece and/or mailpiece content.

Figure 2:
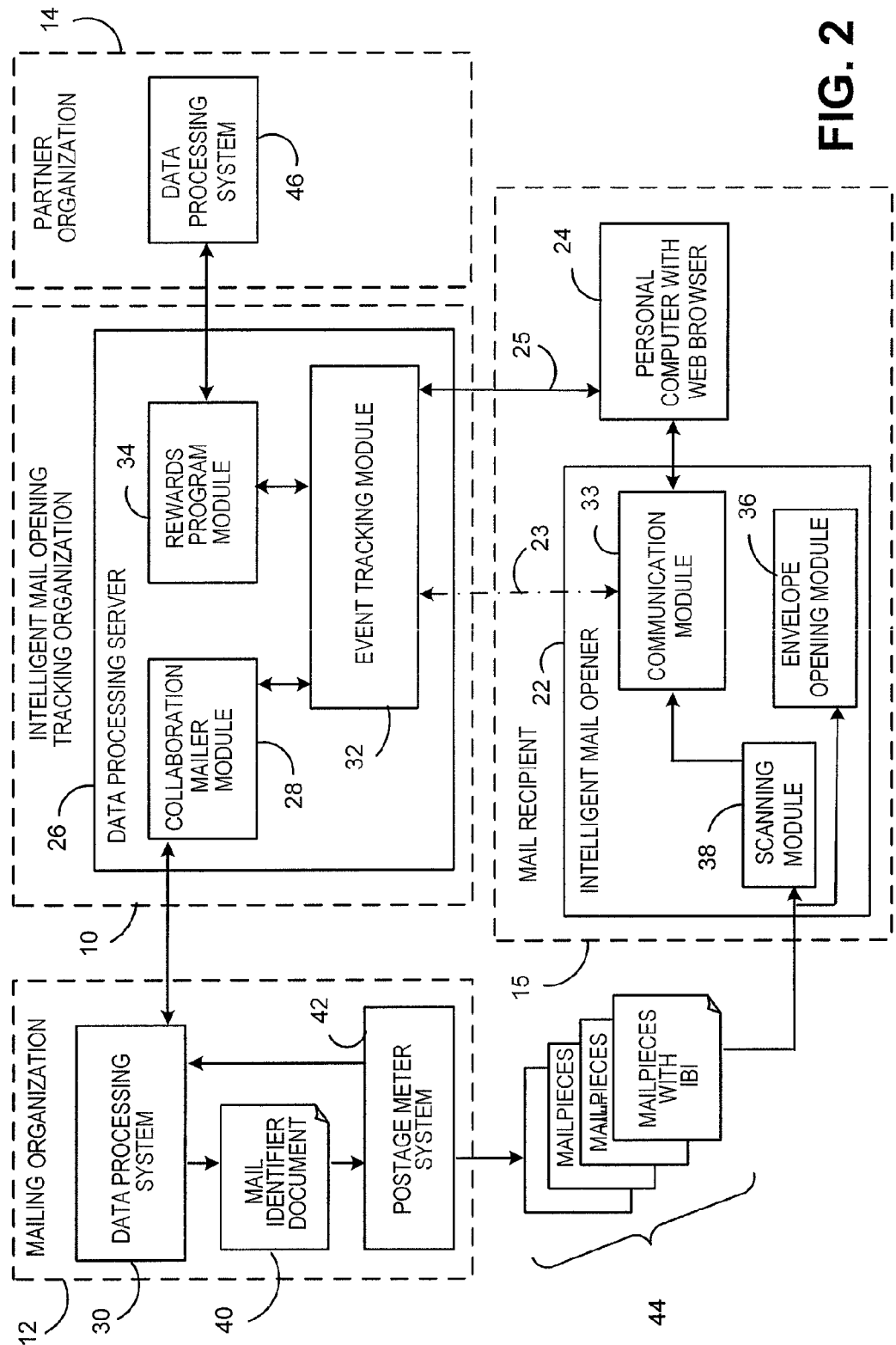
FIG. 2 is a block diagram of an intelligent interactive mail opening tracking system shown in FIG. 1.

Reference is now made to FIG. 2. The tracking organization 10 includes a data processing server 26, which processes information at the tracking organization. The server 26 is connected for bi-directional communications to the mailing organization 12, for example, through a collaboration partner module 28, which communicates with the mailing organization data processing system 30. The data processing server 26 includes an event tracking module 32, which is connected to a rewards tracking module 34 and also to the collaboration mailer module 28. The event tracking module 32 is for connected bi-directional communications with the mailing recipient 15 personal computer PC 24. The mailing recipient 15 intelligent mail opener 22 includes a communications module 33, which may be in communication with the event tracking module 32. The intelligent mail opener 22 further includes an envelope module 36 and a scanning module 38. The organization of the intelligent mail opener is a matter of design and is employed to provide the needed functionality discussed above.

The mailing organization data processing system 30 produces a batch mailpiece identifier or unique mailpiece identifier listed on document 40. This mail identifier document 40 provides identification of the specific batch of mail or list of unique mailpieces and other relevant information about the mail, which is to be processed by the postage meter system 42, and can be employed to provide tracking information for the mail to be sent to various recipients. The mail identifier document 40, or other means, provides identification information that is linked to the imprint on the mailpiece and/or the mailpiece contents with specific information concerning the mailpiece, the mailer and the mail recipient. The postage meter system 42 communicates the linkage of the mailpiece information with the IBI tracking information back to the mailer data processing system 30. This specific information embedded in the mailpiece and/or mailpiece content, after the mailpiece is delivered to the mail recipient 15, can be communicated to the event tracking module 32 by the intelligent opener 22 or the mail recipient PC 24, as the case may be. The information is then employed for use in the rewards program module 34. The information may also be employed for statistical compilations or other purposes, and also to be communicated to the partner organization 14 from the rewards program module 34 to the partner organization 14 data processing system 46, and also communicated to the mailing organization 12 from the collaboration partner module 28. Various mailpieces, such as mailpieces 44, which may have imprinted thereon an IBI indicia, are sent from the mail organization 12 to the various mail recipients 15 for processing by the intelligent mail opener 22.

The partner organization 14 may be an organization that provides rewards programs for various organizations, or can be an organization which itself provides the rewards. For example, an organization such as American Express has various rewards programs for card members for using American Express credit cards. The program may be implemented by American Express itself, such as for discounts on American Express tours, or by partner organizations, such as for access to frequent flier awards on an airline for free or upgraded status air travel. American Express can be the mailing organization preparing and sending the mailpiece or a service can be employed to implement the mailing on behalf of American Express.

The affinity rewards program provides a specific inducement to the mail recipient 15 to open received mailpieces 44. The rewards program and formulations of specific responses may be managed by the partner organization 14 or the mailing organization 12 or even the tracking organization 10. This opening of a mailpiece is communicated to the event tracking module 32, either by the intelligent mail opener 22 or by the recipient personal computer PC 24. This provides information to the tracking organization 10, which enables the mailing organization 12, the rewards program partner organization 14, or the tracking organization 10 to formulate and provide valuable marketing data and various offers to the mail recipient 15, based on the mail recipient specific interests and specific mailings.

The responses to the mail recipient 15 can include pop-up information on the mail recipient PC screen 29, automatic scheduling of financial transactions, such as invoice payments, additional mailing of related information, animation, and other advertising not feasible within the mailpiece itself. The responses from the tracking organization 10 to the mail recipients 15 are based on information received by the tracking organization over the various communications channels and generated by the tracking organization. The information is processed to formulate a response to the mail recipient 15. The processed information can include mailpiece identification and/or tracking information received from the mailer (mailing organization 12), affinity information and offers received from the partner organization 14, and mail opening notification and/or other related data received from the mail recipient intelligent mail opener 22. This enables a personalized interactive dialogue with the mail recipient 15, based on the opening of a specific mailpiece and also, where this is the case, on further communications from the mailpiece recipient based on the mailpiece content which demonstrates that the mailpiece was not merely opened but that the mail recipient 15 actually looked at the mailpiece content data. The mailpiece content data may, for example, include a code number printed on the content that that is sent back to the tracking organization 10 by the mail recipient 15.

Data can be maintained at the tracking organization 10 of various combinations of mailpieces which are opened by the recipient 15 and/or mailpiece content is looked at, allowing the formulation of different marketing offers and contact approaches to the mail recipient 15. For example, if three mailpieces were opened, one having to do with kitchen cabinets, the other having to do with flooring, and a third having to do with kitchen sinks, this may trigger a mailing by the mailing organization 12 of information concerning a refrigerator or an interactive pop-up on the mail recipient PC screen 29 of available refrigerators, or both. Another example of the interactive communication is an opening of a mailpiece concerning a specific car that can cause an interactive communication with a video of the specific car being shown on the mail recipient PC screen 29.

Figure 3:
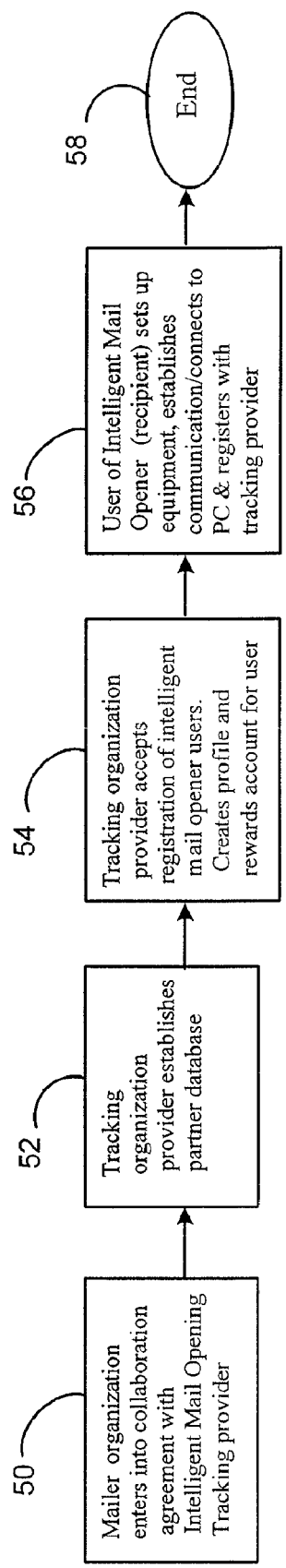
FIG. 3 is a flowchart of the process for setup of the mailing organization, the tracking organization, the partner organization and the mail recipient users, of the intelligent interactive mail opening tracking system shown in FIGS. 1 and 2; and, FIG. 4 is a flowchart of the operation of the intelligent interactive mail opening tracking system shown in FIGS. 1 and 2.

Reference is now made to FIG. 3, which is a flowchart of the process for set up of the mailing organization 12, the tracking organization 10, and the partner organization 14 for the intelligent interactive mail opening tracking system shown in FIGS. 1 and 2. At block 50, a mailing organization 12 enters into a collaboration agreement with the mail tracking organization 10. At block 52, the tracking organization 10 establishes a partner organization 14 database and, at block 54, the tracking organization 10 accepts registration of intelligent mail opener users (mail recipients 15). At block 54, the tracking organization 10 also creates a profile and rewards account for the mail recipients 15. At block 56, the mail recipients 15 sets up equipment, including the intelligent mail opener 22, connects the mail recipient PC 24 to the intelligent opener 22, and establishes communications with and registers with the tracking organization 10. The set up operation ends at block 58.

Figure 4:
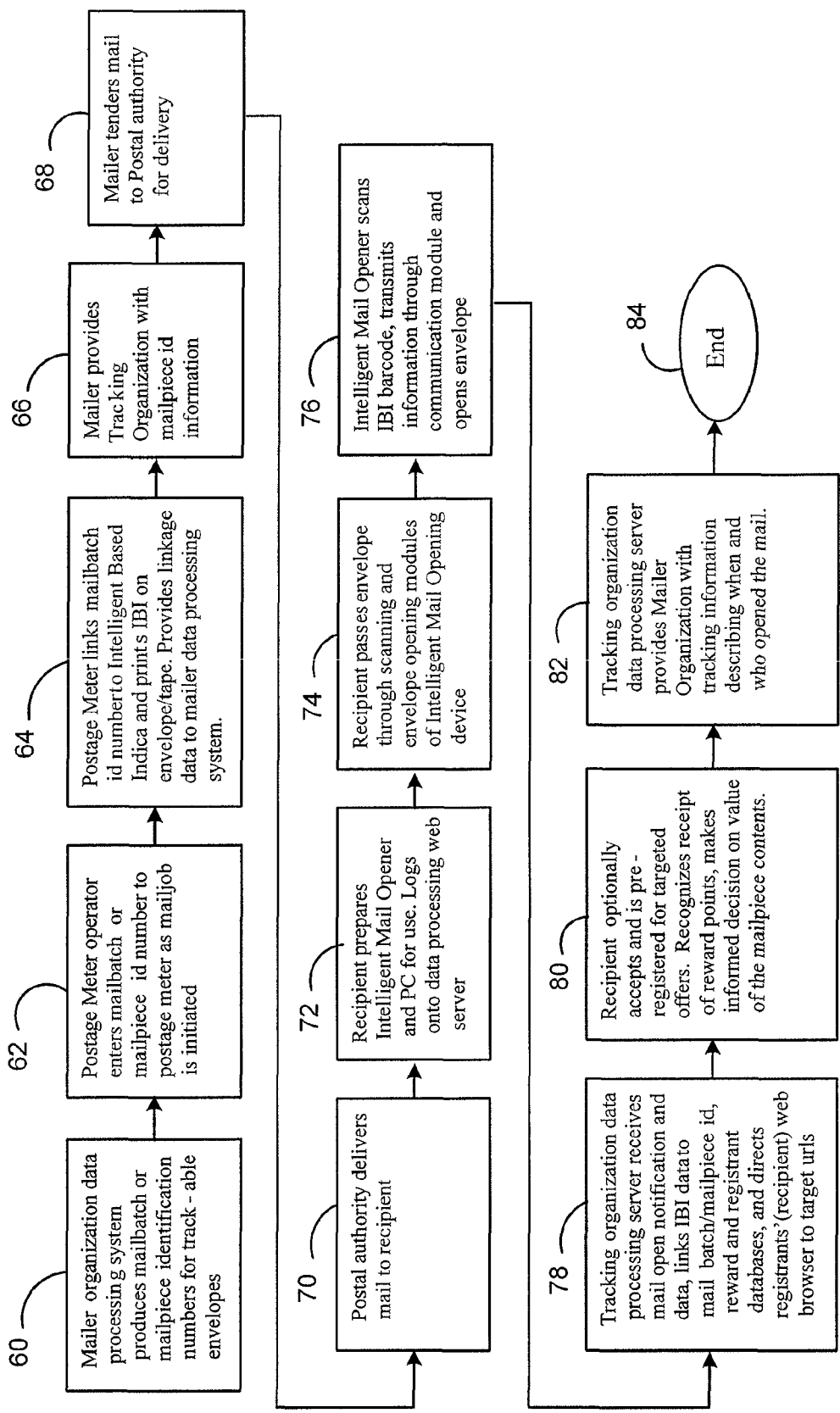

Reference is now made to FIG. 4. At block 60, a mailing organization data processing system produces batch identification or unique mailpiece identification numbers for trackable envelopes. At block 62, the postage meter system operator enters mail identification number or other identification data into a postage meter system and a mail job is initiated. Other methods of entering tracking data for the mailpieces such as those described above, can be implemented at this point or when the mailpiece is being prepared, as for example, information printed on the mailpiece content which is visible through a windowed envelope. At block 64, the postage meter IBI system links the mailbatch or mailpiece identification number with the IBI indicia or other area on the envelope and prints the indicia on the envelopes to be mailed. The postage meter system provides the linkage information back to the mailer data processing system 30. At block 66, the mailing organization 12 provides the various tracking information concerning the mailpieces to the tracking organization 10. At block 68, the mailing organization 12 tenders the mail to a postal authority or other delivery service for delivery. At block 70, the postal authority or delivery service delivers the mail to the mail recipients 15.

At block 72, the mail recipient 15 prepares the intelligent mail opener 22 and the mail recipient PC 24 for use. At block 72, the mail recipient 15 also logs onto the data processing web server of the tracking organization 10 or otherwise sets up the interactive communication. The tracking organization web server is part of the event tracking module 34. The mail recipient 15 at block 74 passes the envelope through the scanning module 38 and envelope opening module 36 of the intelligent mail opening device 22. The intelligent mail opener at block 76 scans the IBI barcode, which may be printed as a two dimensional barcode and/or other mailpiece identification data, as the case may be, transmits the information through the communications module 33, and opens the received envelope. Various specifics can be provided in the mailpiece contents itself, which are required to be viewed by the mail 15 recipient in order to activate a specific affinity program, such as the code noted above. In such case, opening the mailpiece would not necessarily result in the benefit or full benefit of the affinity program. To activate the affinity program or to receive full benefit may require that specific information be sent to the tracking organization 10 by the mail recipient 15, possibly through entering of data such as offer numbers identified in the mailpiece contents to specific web pages or return of Business Reply Mail postcards.

At block 78, the tracking organization data processing server 26 receives mail opening activity notification and other data, links to the mailpiece identification, reward and registrant databases, and directs the web browser of the mail recipient PC 24 to one or more target web-based Universal Resource Locations (URLs). It can also cause pop-ups in the mail recipient PC screen 29 and the like to occur on the mail recipient PC 24. At block 80, the mail recipient optionally accepts and is pre-registered for targeted offers, recognizes receipt of rewards points, and/or makes informed decisions on the value of the mailpiece contents. At block 82, the tracking organization data processing server 26 provides the mailing organization 14 with tracking information describing when and who opened the mail and/or other relevant information that may be accumulated through the opening of a plurality of mailpieces. The operation ends at block 84.

The mail recipient 15 benefits with the automated opening of envelopes, rewards for doing a daily task and, where desired, the ability to specify "do not mail" preferences and the automatic creation of electronic bill pay/tickler transactions. The mailing organizations benefit with the knowledge that the mailpiece was opened, and when it was opened, thereby providing the opportunity for immediate web-based targeted messaging with high potential follow-up and the increased likelihood of responses. The tracking organizations benefit by having multiple revenue streams (registrants, mailers, partners, etc.), the ability to sell equipment, and access to new customers.

While the present invention has been disclosed and described with reference to a single embodiment thereof, it will be apparent, as noted above, that variations and modifications may be made therein. It is, thus, intended in the following claims to cover each variation and modification that falls within the true spirit and scope of the present invention.

What is claimed is:

1. A mail opening tracking system, comprising:
   a mailing organization and a mail tracking organization;
   a communications channel connected between said mailing organization and said mail tracking organization for communicating mailpiece identifying information embedded in mailpieces prepared for mailing to recipients;
   a mail recipient mail opener including an optical scanner for scanning a code on the mailpiece to obtain said identifying information; and,
   a communications channel connected between said mailpiece recipient mail opener and said mail tracking organization for communicating mailpiece opening events of mailpieces opened by said mail recipient mail opener and identifying data retrieved from mailpieces opened by said mail recipient mail opener.

2. A mail opening tracking system as defined in claim 1 wherein said communications channel connected between said mail recipient mail opener and said mail tracking organization includes a recipient personal computer connected between said mail recipient mail opener and said mail tracking organization.

3. A mail opening tracking system as defined in claim 2 wherein said recipient personal computer connected between said mail recipient mail opener and said mail tracking organization is connected for bi-directional communications such that mail opening events by said recipient mail opener are communicated to said tracking organization and responses by said tracking organization to said mail opening events are communicated to said recipient personal computer.

4. A mail opening tracking system as defined in claim 3 wherein said mail recipient mail opener includes an envelope opening module, a communication module, a clock module and a scanning module that scans identifying data on envelopes opened by said opening module such that said mail opening events communicated to said tracking organization include identifying data retrieved from mailpieces scanned by said scanning module.

5. A mail opening tracking system as defined in claim 4 wherein said responses by said tracking organization to said mail opening events are communicated to said recipient personal computer and are responses to a plurality of mailpiece opening events of mailpieces opened by said mail recipient mail opener communicated to said tracking organization.

6. A mail opening tracking system as defined in claim 5 wherein mailpiece opening events of mailpieces opened by said mail recipient mail opener communicated to said tracking organization includes the date and time of said mailpiece opening events and identifying data retrieved from mailpieces opened by said mail recipient mail opener and wherein said mail opener is registered at said tracking organization with a specific mail recipient.

7. A mail opening tracking system as defined in claim 5 wherein identifying data retrieved from mailpieces opened by said mail recipient mail opener communicated to said tracking organization includes identifying data of said mailpiece, said mailing organization and the mailpiece recipient.

8. A mail opening tracking system as defined in claim 3 wherein said responses by said tracking organization to said mail opening events comprise affinity program messages associated with said mail opening events.

* * * * *